March 7, 1961 C. J. BOGNAR 2,973,662
DIFFERENTIAL SIGNAL DEVELOPER
Filed July 19, 1957 3 Sheets-Sheet 1

FIG. I

INVENTOR.
CHARLES J. BOGNAR
BY
Oberlin & Limbach
ATTORNEYS

March 7, 1961 C. J. BOGNAR 2,973,662
DIFFERENTIAL SIGNAL DEVELOPER
Filed July 19, 1957 3 Sheets-Sheet 2

INVENTOR.
CHARLES J. BOGNAR
BY
*Oberlin & Limbach*
ATTORNEYS

March 7, 1961   C. J. BOGNAR   2,973,662
DIFFERENTIAL SIGNAL DEVELOPER
Filed July 19, 1957   3 Sheets-Sheet 3

INVENTOR.
CHARLES J. BOGNAR
BY
Oberlin & Limbach
ATTORNEYS

United States Patent Office 2,973,662
Patented Mar. 7, 1961

2,973,662
DIFFERENTIAL SIGNAL DEVELOPER

Charles J. Bognar, Parma, Ohio, assignor to The Yoder Company, Cleveland, Ohio, a corporation of Ohio Filed July 19, 1957, Ser. No. 672,966

2 Claims. (Cl. 74—472)

This invention relates as indicated to a precision synchronizer, and more particularly to a device adapted to detect slight differences in the speeds of rotation of two rotating objects and to deliver a signal which may be utilized to adjust and control the speed of one or both such objects to bring them into desired synchronism.

A variety of different synchronizers are known in the art, and some of them are very complex mechanisms requiring delicate adjustment and maintenance. With the increased speeds of production of many types of continuous elongated articles such as steel strip, bar stock, tubing and the like, which are usually cut into predetermined lengths by means of a flying shear, it becomes increasingly important that the actuation of such shear be precisely correlated with the speed of the mill on which such article is produced. Relatively small errors in synchronism may result in rather substantial discrepancies in the lengths cut off. It is also of importance that the synchronizing means employed be relatively rugged in construction in order that it may continue to operate satisfactorily under mill conditions.

It is accordingly an important object of my invention to provide a precision synchronizer operative to detect differences in the speeds of rotation of two rotating objects and to deliver a signal which may then be utilized to correct any discrepancies, or for other purposes.

Another object is to provide such mechanism which will be relatively rugged and require little maintenance.

A further object is to provide such mechanism which will be substantially entirely mechanical in construction and relatively inexpensive of manufacture.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
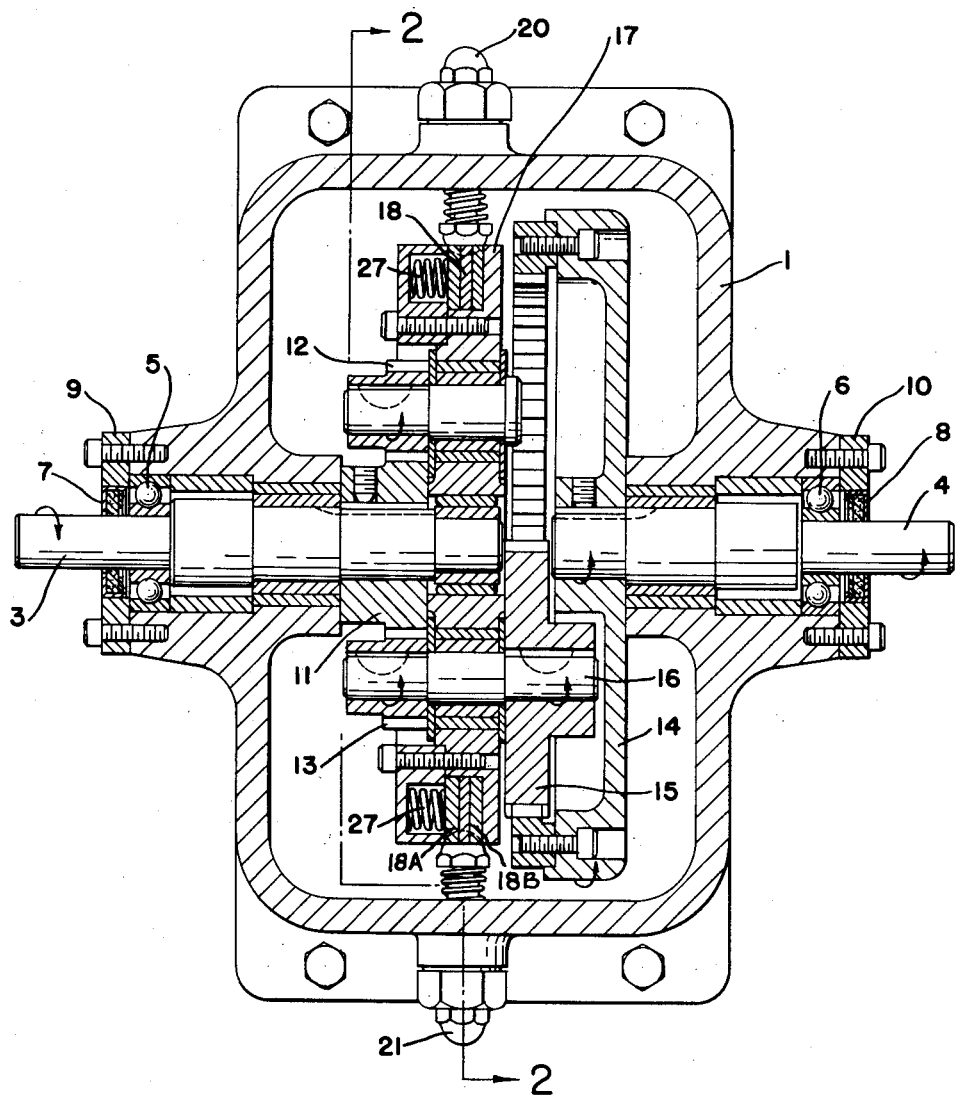
Fig. 1 is a section taken through one embodiment of my new device along the aligned axes of two shafts, the speeds of which are to be correlated.

Referring now more particularly to said drawing, the embodiment of my invention there illustrated comprises a housing 1 having a cover plate 2 bolted thereon. Two co-axial input shafts 3 and 4 are journalled in opposite sides of such housing with their inner ends extending within the housing and slightly spaced apart. Bearings 5 and 6 and seals 7 and 8 are secured in place by means of caps 9 and 10 on the respective bosses in which such shafts are thus journalled. As indicated by the arrows on Fig. 1, shafts 3 and 4 will be driven (by means not shown) in opposite directions.

Shaft 3 drives spur gear 11 which in turn drives pinion gears 12 and 13 at speeds twice that at which shaft 3 and gear 11 turn, the pitch diameters of gears 12 and 13 being half that of gear 11.

The other input shaft 4 drives internal gear 14 at a speed which for our purpose will be taken as the same as that of shaft 3 and spur gear 11. Such internal gear 14 drives spur gear 15 in the same direction of rotation as that in which pinion gear 13 is driven as above described, such gears 13 and 15 both being keyed to shaft 16 carried in spider body 17. Since spur gear 15 and pinion gear 13 are caused to rotate at identical speeds, no travel of shaft 16 about the input center line (axis of shafts 3 and 4) will occur, the inducing speeds being identical but opposite in direction and consequently resulting in zero differential.

If either shaft 3 or shaft 4 is caused to rotate at a different speed from the other, however, pinion gear 13 and spur gear 15 also will tend to rotate at speeds induced by their respective driving gears but since such gears 13 and 15 are keyed to the same shaft 16, their speeds of rotation are obviously required to be identical. To achieve these conditions simultaneously, the difference in speed between shafts 3 and 4 appears as a drift of the spider 17 in which shaft 16 is journalled. Pinion gear 12 is not essential to such operation but has been incorporated to increase the stability of the system. Such drift of spider 17 about the axis of shaft 3 is in the direction of the greater induced speed and the amount of this drift as measured relative to the input shaft center line is one-half the difference in their speeds, being a simple geometric relationship. If this difference in speed between the two input shafts 3 and 4 is permitted to persist, the spider 17 will progress at this differential speed around the input shaft center line, and such movement may be utilized to actuate other devices.

Figure 2:
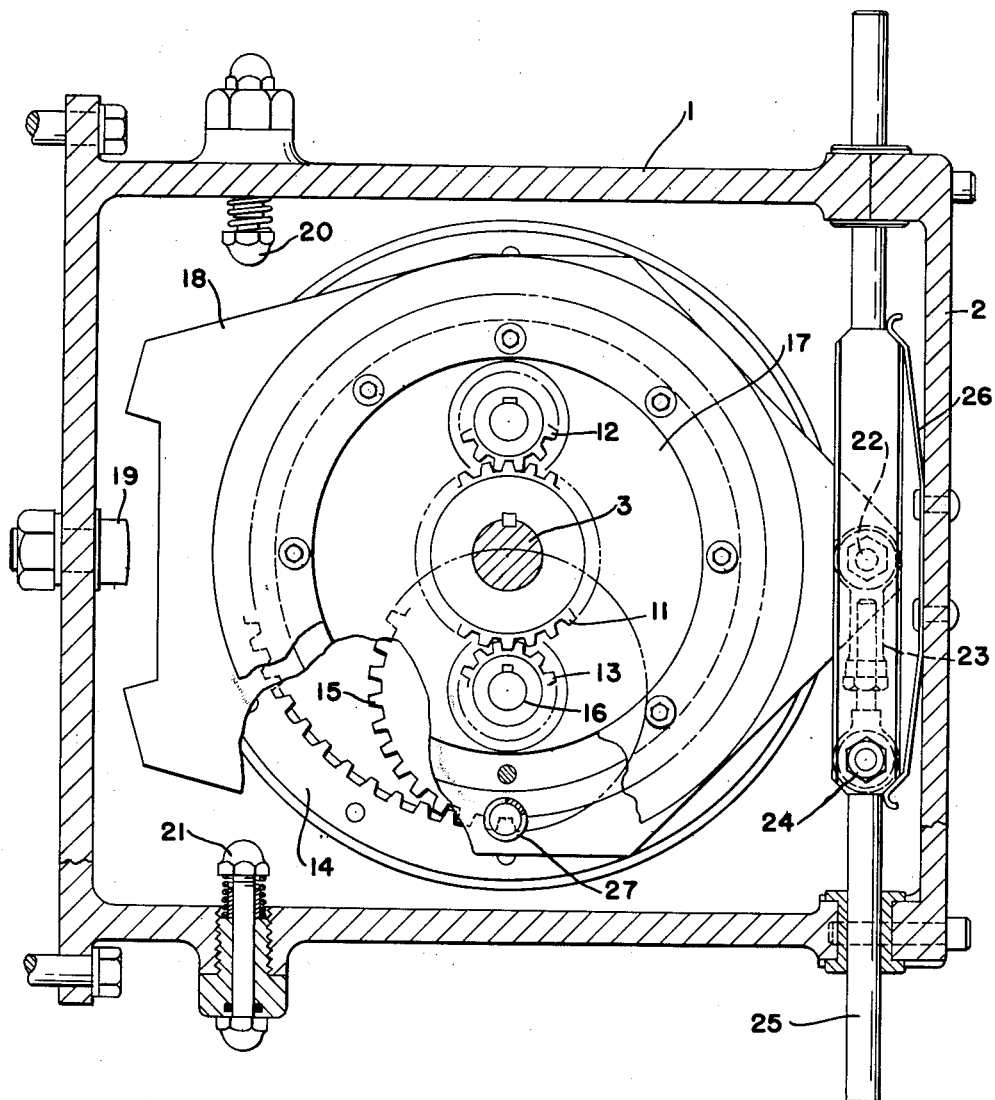
Fig. 2 is a transverse section taken on the line 2—2 on Fig. 1.
Figure 3:
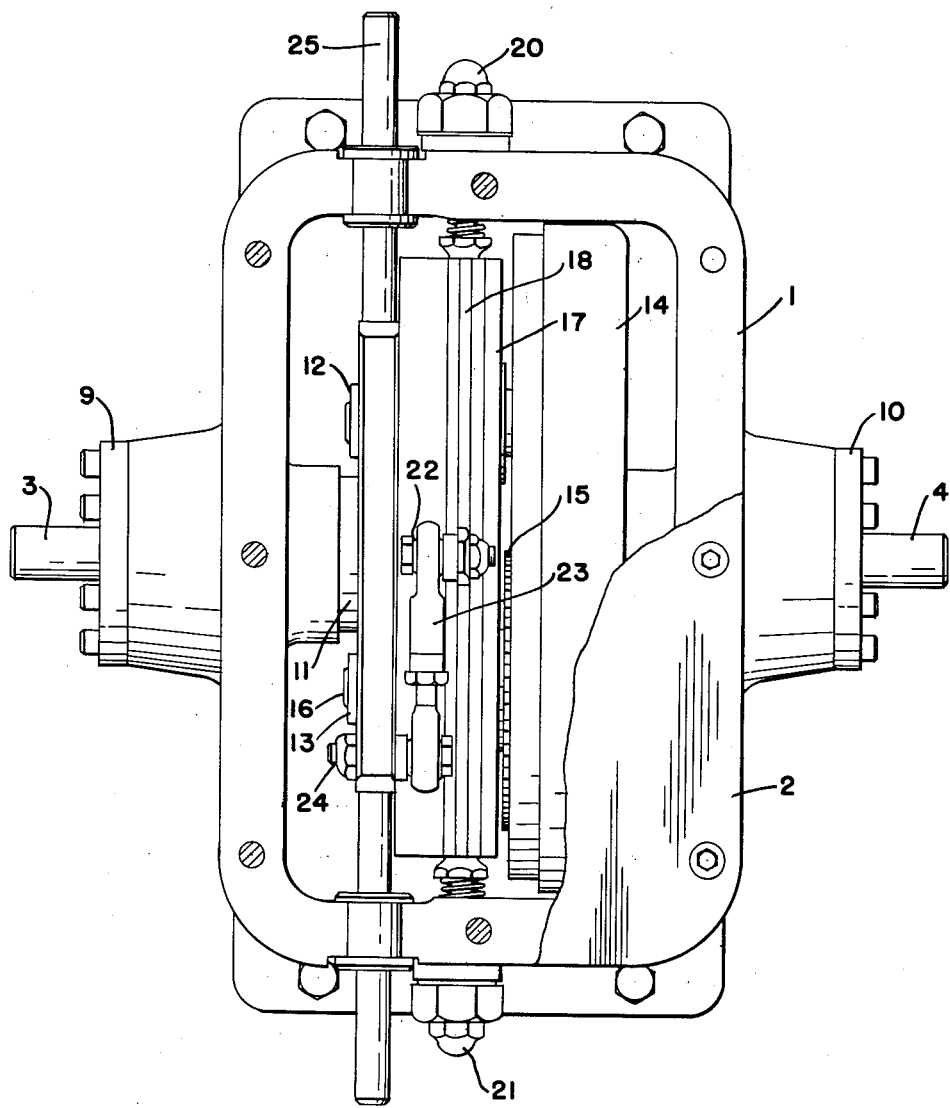
Fig. 3 is a side view of the mechanism looking into the housing with the cover plate substantially removed.

Spider 17 carries a plate 18 (Fig. 2) which is limited in its rotative travel in either direction by engagement with stop 19 secured to housing 1. Before it can engage such stop, however, adjacent side portions of plate 18 will come in contact with the corresponding spring-backed plunger 20 or 21, likewise mounted in housing 1, and the plunger thus reciprocated may be caused to engage appropriate control means such as a micro-switch, for example, to actuate suitable electrical means to regulate the drive for one or both of the input shafts 3 and 4 to correct the discrepancy in their rates of rotation.

A projecting portion of plate 18 is pivotally connected at 22 to a link 23, the other end of which is pivotally connected at 24 to traverse rod 25 axially slidably mounted in housing 1. Consequently, rotative movement of plate 18 about the axis of shaft 3 serves correspondingly to reciprocate rod 25 within the limit imposed by stop 19. Such reciprocation of rod 25 may be utilized to perform any desired mechanical function such as the operation of a "flag" in the sensing system of the well-known Askania or Hague regulators or some other electronic sensing device.

A double ended leaf spring 26 secured to cover plate 2 is arranged resiliently to engage the respective ends of the enlarged central portion of traverse rod 25 so that the force of such spring must be overcome before plate 18 can reciprocate rod 25 past a central position. This arrangement serves to prevent inherent discrepancies and vibrations from actuating the traverse rod 25 and also requires the drawing of a small amount of power from one or the other of the input shafts to effect such reciprocation. This characteristic makes the action of traverse rod 25 a definite function of the input speeds only.

The inner periphery of plate 18 is circular (concentric to shaft 3) and such plate is frictionally laterally clamped to spider 17 by means of compression springs 27 and two laterally embracing friction discs 18A and 18B much in the manner of a clutch plate, this serving as a safety device should such plate engage the limiting stop.

It will be seen from the foregoing that I have provided a mechanism whereby any differential in the speeds of shafts 3 and 4 may be converted into a suitable signal which can be transmitted to the drive means for either of such shafts (that gaining or that lagging in speed) to produce synchronization by speeding up or slowing down the errant component. The continuing differential can be allowed to occur until the plungers 20 and 21 are reciprocated, and such reciprocation may be utilized to perform a predetermined function. While the preferred embodiment of my invention specifically illustrated and described is designed around the planetary gear and its inherent characteristics, it will be understood by those skilled in the art that the principles of my invention may similarly be incorporated into a device based on the characteristics of the bevel gear differential.

The mechanism of this invention is rugged and relatively simple and inexpensive of construction. It is suitable for use in shops and mills where it may be subjected to severe operating conditions such as those encountered in the operation of a flying shear. My new device is also a self-contained unit adapted for installation where desired.

It will be apparent that the restraining action of leaf spring 26 should be weaker than the frictional grip of the clutch plates on plate 18. At identical input speeds and zero differential, the gear ratios are selected to drive pinion 13 and spur gear 15 at the same speed (they are keyed to the same shaft). It is, of course, possible to detect any change in a predetermined speed relationship of shafts 3 and 4, the gear ratios being selected to drive pinion 13 and spur gear 15 at the same r.p.m. when the desired relationship in the speeds of rotation of shafts 3 and 4 is being maintained, and the principles of my invention are accordingly applicable even when the desired speeds of shafts 3 and 4 are not the same. It is further possible to establish a definite amount of differential between input shafts by proper selection of gear ratios, disc 18 being provided with a driving surface suitable for driving auxiliary apparatus or a recorder, for example. In such cases stop 19 and plungers 20 and 21 are omitted as well as rod 25 and associated parts.

Housing 1 will ordinarily be partly filled with oil, one of the advantages of my new self-contained unit. My device is a differential signal developer which may be used for a variety of purposes but will ordinarily be employed to actuate controls to maintain the desired relative r.p.m. ratio of the two inputs shafts 3 and 4. A conventional Askania or Hague sensing head or transmitter may be provided actuated by reciprocation of rod 25, the control analyzer being the other component of such head which will convert the signal to control the power of the drive motor or motors.

Other modes of applying the principle of the invention may be employed, change being made as regards the details described, provided the features stated in any of the following claims or the equivalent of such be employed.

I therefore particularly point out and distinctly claim as my invention:

1. A precision synchronizer comprising a housing, a first shaft journalled in said housing, a second shaft journalled co-axially in said housing with its inner end opposed to and slightly spaced from the inner end of said first shaft, said shafts being adapted to be driven at equal speeds in opposite directions; a spur gear keyed to said first shaft within said housing, a spider body pivotally mounted on the inner end portion of said first shaft, two identical pinion gears pivotally mounted on said body on stub shafts parallel to said first shaft and on diametrically opposite sides thereof, said pinion gears meshing with said spur gear and having diameters one-half the diameter of said spur gear, whereby said pinion gears will be driven at speeds twice that at which said first shaft and spur gear turn when said body is stationary; an internal gear keyed to said second shaft within said housing, a spur gear keyed to the same stub shaft as one of the aforesaid pinion gears for rotation therewith, said latter spur gear meshing with said internal gear; a plate frictionally engaging said spider body for co-axial rotation therewith but projecting outwardly therebeyond, fixed stop means carried by said housing adapted to engage said plate positively to limit rotation thereof, a pair of spring backed plungers carried by said housing and mounted for engagement and reciprocation by said plate as the latter turns in one direction or the other respectively prior to encountering said fixed stop means, whereby such movement of said plungers may be utilized to actuate speed control means or the like as may be desired; a traverse rod mounted for reciprocation in said housing in a plane normal to the axis of said shafts, link means pivotally interconnecting said plate and rod for reciprocation of the latter by any slight pivotal movement of said plate, a boss on said rod within said housing, and a leaf spring secured to said housing in its mid-portion with its two end portions projecting and respectively engaging opposite ends of said boss resiliently to resist initial reciprocation of said rod from a central position.

2. A precision synchronizer comprising a housing, a first shaft journalled in said housing, a second shaft journalled co-axially in said housing with its inner end opposed to and slightly spaced from the inner end of said first shaft, said shafts being adapted to be driven at equal speeds in opposite directions; a spur gear keyed to said first shaft within said housing, a body mounted within said housing for pivotal movement about the axis of said shafts, a pinion gear pivotally mounted on a shaft journalled in said body parallel to such axis and meshing with said spur gear, said pinion gear having a diameter one-half that of said spur gear, whereby said pinion gear will be driven at speeds twice that at which said first shaft and spur gear turn when said body is stationary; an internal gear keyed to said second shaft within said housing, a spur gear keyed to the same stub shaft as said pinion gear for rotation therewith, said latter spur gear meshing with said internal gear; a plate frictionally engaging said body for co-axial rotation therewith but projecting outwardly therebeyond, fixed stop means carried by said housing adapted to engage said plate positively to limit rotation thereof, a pair of spring backed plungers carried by said housing and mounted for engagement and reciprocation by said plate as the latter turns in one direction or the other respectively prior to encountering said fixed stop means, whereby such movement of said plungers may be utilized to actuate speed control means or the like as may be desired; a traverse rod mounted for reciprocation in said housing in a plane normal to the axis of said shafts, link means pivotally interconnecting said plate and rod for reciprocation of the latter by any slight pivotal movement of said plate, and means effective to resist initial reciprocation of said rod from a central position.

References Cited in the file of this patent

UNITED STATES PATENTS

| | | |
|---|---|---|
| 555,295 | Anderson | Feb. 25, 1896 |
| 1,672,670 | Wilfart | June 5, 1928 |
| 2,205,235 | Arnold et al. | June 18, 1940 |
| 2,252,545 | Benz | Aug. 12, 1941 |
| 2,782,902 | Sloane | Feb. 26, 1957 |